United States Patent [19]

Sackmann et al.

[11] 4,152,312

[45] May 1, 1979

[54] PAPER-SIZING AGENTS

[75] Inventors: Günter Sackmann, Opladen; Wulf von Bonin, Leverkusen; Friedhelm Müller, Odenthal, Berg.-Gladbach; Günter Kolb, Leverkusen, all of Fed. Rep. of Germany

[73] Assignee: Bayer Aktiengesellschaft, Fed. Rep. of Germany

[21] Appl. No.: 529,695

[22] Filed: Dec. 5, 1974

[30] Foreign Application Priority Data

Dec. 11, 1973 [DE] Fed. Rep. of Germany ....... 2361544

[51] Int. Cl.² .............................................. C08L 33/02
[52] U.S. Cl. ......................... 260/29.6 H; 260/29.6 N;
260/29.6 E; 526/272; 526/318
[58] Field of Search .................... 260/29.6 H, 29.6 N, 260/29.6 E, 78.5 R, 78.5 T

[56] References Cited

U.S. PATENT DOCUMENTS

| | | | |
|---|---|---|---|
| 2,378,629 | 6/1945 | Hanford | 260/80.76 |
| 2,725,367 | 11/1955 | Niederhauser | 260/30.4 R |
| 2,930,775 | 3/1960 | Fordyce | 260/29.6 H |
| 3,322,713 | 5/1967 | Williams | 260/78.5 T |
| 3,598,778 | 8/1971 | Burdick | 260/78.5 T |
| 3,706,704 | 12/1972 | Heilman | 260/78.5 R |

*Primary Examiner*—Paul R. Michl
*Attorney, Agent, or Firm*—Connolly and Hutz

[57] ABSTRACT

Anionic sizes for paper or a paper-like material. Substantially equimolecular copolymers of maleic acid anhydride and diisobutylene are esterified to form the corresponding semi-esters. From 10 to 100 mol-% of the anhydride groups are reacted with an aliphatic or cycloaliphatic alcohol. At least 50 mol-% of the formed carboxylic groups are neutralized with alkali, ammonia or aliphatic amines.

1 Claim, No Drawings

PAPER-SIZING AGENTS

The invention relates to anionic sizes for paper as for paper-like materials based on semiesters of diisobutylene/maleic acid anhydride copolymers in the form of their alkali, amine or ammonium salts.

It is known that copolymers of diisobutylene and maleic acid anhydride can be obtained by radical copolymerisation (cf. US-PS, 2,378,629).

It is also known that terpolymers can be obtained from 2 to 3 mols of maleic acid anhydride, 3 to 2 mols of diisobutylene and 0.3 to 5% by weight of divinylbenzene, based on the sum of maleic acid anhydride and diisobutylene, and that the alkali or ammonium salts of these terpolymers can be used for the surface sizing of paper (cf. U.S. Patent Specification No. 2,725,367). It is emphasised and proved by figures given in this U.S. Patent Specification that the alkali or ammonium salts of the terpolymers have a much better sizing effect for paper than corresponding salts of copolymers of maleic acid anhydride and diisobutylene.

The object of the invention is to modify conventional sizes based on maleic acid anhydride/diisobutylene copolymers in such a way that the sizing effects obtained are better than those obtained with conventional sizes, largely irrespective of the pH-value.

According to the invention, this object is achieved by virtue of the fact that the anhydride groups of the diisobutylene/maleic acid anhydride copolymers are converted wholly or in part into semiesters and the residual anhydride or carboxyl groups are subsequently converted wholly or in part into alkali, amine or ammonium salts, and used as sizes.

Accordingly, the invention provides anionic sizes containing aqueous or aqueous alcoholic alkali aliphatic amine or ammonium salt solutions of substantially equimolecular copolymers of maleic acid anhydride and diisobutylene, with 10 to 100 mol % of the anhydride groups of the copolymers esterified with linear or branched aliphatic monoalcohols having 1 to 20 carbon atoms or with cycloaliphatic monoalcohols containing 5 to 6 carbon atoms, to form the corresponding semiesters.

Radically produced copolymers of 0.9 to 1.1 mol of maleic acid anhydride and 1.1 to 0.9 mol of diisobutylene are used for preparing the sizes according to the invention. In addition to being used in pure form, the diisobutylene can also be used in the form of its commercial-grade mixtures. Radical-forming substances, for example peroxides, hydroperoxides, per esters, azo compounds, also redox catalyst systems, can be used for initiating the copolymerisation reaction.

Polymerisation can be carried out in the absence of pressure either by bulk or, preferably, in solution. In cases where polymerisation is carried out in solution, it is preferred to use solvents of the kind in which both the monomers and also the copolymers are soluble, for example aromatic hydrocarbons such as benzene, toluene, halogenated aromatic hydrocarbons such as chlorobenzene, chlorotoluene, lower ketones such as acetone, ethylmethylketone, esters of lower fatty acids such as ethyl acetate, chlorinated aliphatic hydrocarbons such as chloroform, carbon tetrachloride, ethers such as tetrahydrofuran and highly polar solvents such as dimethylformamide or dimethylsulphoxide. The polymerisation temperature is in the range from 20° to 150° C., preferably in the range from 30° to 120° C.

From 10 to 100 mol percent, preferably 15 to 50 mol percent, based on the anhydride content of the copolymers obtained can be converted into the corresponding semiesters by reaction with from 0.1 to 5.0 mols, preferably 0,2–1,0 mols, based on 1 mol of maleic acid anhydride groups in the copolymer, of aliphatic linear or branched $C_1$–$C_{20}$, preferably $C_1$–$C_8$ monoalcohols such as methanol, ethanol, propanol, isopropanol, butanol, amylalcohol, isoamylalcohol, hexanol, 2-ethylhexanol, dodecanol, octadecanol, preferably isopropanol or ethanol or cycloaliphatic $C_5$–$C_6$ monoalcohols, preferably cyclohexanol. Semiester formation is carried out either in substance or in a solvent in which both the copolymer and the semiester are soluble, for example the aforementioned alcohols, aromatic hydrocarbons, such as toluene, halogenated aromatic hydrocarbons such as chlorobenzene, chlortoluene, lower ketones such as acetone, ethylmethylketone, esters of lower fatty acids such as ethyl acetate, chlorinated aliphatic hydrocarbons such as carbon tetrachloride, esters such as tetrahydrofuran, highly polar solvents such as dimethyl formamide and dimethylsulphoxide, at temperatures in the range from 20° to 120° C., preferably at temperatures in the range from 20° to 90° C. The copolymers present in the sizes according to the invention are generally alternating and equimolecular in structure with degrees of polymerisation of from 20 to 800, preferably from 80 to 120.

It is of course also possible directly to polymerise diisobutylene with the required maleic acid semiesters under the same conditions as for diisobutylene/maleic acid anhydride copolymerisation, to form the corresponding copolymers.

The reaction products of maleic acid anhydride/diisobutylene copolymers and monoalcohols can be converted into their alkali or ammonium salts by the hydroxides of the alkali metals or by primary, secondary or tertiary aliphatic amines such as, for example, methylamine, dimethylamine, ethanolamine, triethylamine, diethanolamine or triethanolamine, although it is preferred to use aqueous ammonia.

The quantity of alkali, aliphatic amine or ammonia used for salt formation is by no means critical, and an excess by no means impairs the sizing effect of the product according to the invention. For physiological reasons, however, it is preferred to use stoichiometric or even less than stoichiometric quantities of alkali, aliphatic amines or ammonia, based on the free carboxyl groups or anhydride groups. In cases where stoichiometric deficits are used, at least 50 mol-% of the carboxyl groups present in the copolymer should be neutralized by alkali, aliphatic amines or ammonia. In order to obtain water-soluble products, from 80 to 100 mol-% of the carboxyl groups or anhydride groups should be neutralised.

The copolymers can be converted into their alkali, amine or ammonium salts either by dissolving the powdered semiester products precipitated in aqueous solutions of alkali, aliphatic amine or ammonium compounds, or by adding the aqueous alkali or ammonium compounds to the solutions of the semiester polymers. In the latter case, the solution or emulsion formed can be used as such, or the solvent (s) can even be removed by destillation, optionally in vacuo, resulting always in the formation of an odourless almost colourless aqueous solution.

The sizes according to the invention have a wide range of uses in the sizing of paper. They can be used on unsized paper, paper that has been presized in conventional manner and in combination with other sizes, preferably for surface sizing. Another advantage of the sizes according to the invention is that they can also be used for sizing papers with little or no polyvalent metal ion content, for example aluminium ion content, and do not interfere in any way with the activity of white toners. They can be used in conjunction with acid, neutral or even basic fillers, such as chalk, kaolin, china clay or others, and with additives such as carboxymethyl cellulose or, in particular, starch.

Another surprising property of the new sizes according to this invention is that they are in no way sensitive to fluctuations in the pH-range of the sizing solution. Thus, the sizes according to the invention are always equally effective both when applied to unsized paper and when applied to conventionally presized paper at pH-values in the range from 4 to 11, preferably at pH-values in the range from 5 to 10.

The new sizes are marketed in the form of aqueous or aqueous-alcoholic solutions, preferably in the form of aqueous solutions of their ammonium salts or alkali salts having a solids content of from 5 to 75% by weight. However, they are often used in heavily diluted form with solids contents of from 0.005 to 10% by weight in the sizing process itself.

The sizes according to the invention can be applied either by mixing with the pulp, by subsequent impregnation or spraying of the paper sheet and other standard techniques. The production of the new sizes and the way in which they work are described by way of example in the following. The parts and percentage contents quoted relate to weight unless otherwise stated.

Size A

2940 Parts of maleic acid anhydride, 4500 parts of diisobutylene and 4080 parts of dry toluene were heated to 75° C. under a slight nitrogen excess pressure in a 40 liter capacity steel autoclave. 63 parts of azodiisobutyronitrile in 1080 parts of dry toluene were then introduced into this solution over a period of 3 hours. After a reaction time of 6 hours, the temperature was increased to 85° C., followed by the addition of 31.5 parts of azodiisobutyronitrile in 540 parts of toluene. After another 6 hours, the temperature was increased to 95° C. and kept at that level until the monomers had been quantitatively polymerised. Thereafter, the temperature was reduced to 80° C. and a solution of 900 parts of isopropanol in 750 parts of toluene was added, followed by stirring for two hours at the aforementioned temperature. 24500 parts of electrolyte water and 4300 parts of an approximately 25% aqueous ammonia solution were then introduced into the clear, highly viscous polymer solution obtained. Following the application of a weak vacuum, the toluene was azeotropically distilled off with stirring at 80° C. through a reflux type distillation bridge until a clear, pale yellow solution appeared in the reflux section. This solution, which had a solids content of 20% by weight, can be used as a size either directly or after suitable dilution with water.

Size B 21.0 parts of a 1:1 copolymer of maleic acid anhydride and diisobutylene identical with that used for size A, but isolated in powder form, were dissolved in 140 parts of tetrahydrofuran. After two drops of concentrated sulphuric acid had been added to this solution, 1.6 parts of methanol in 25 parts of tetrahydrofuran were introduced dropwise at room temperature, and the mixture was heated under reflux for another two hours. The polymer solution formed (semiester) was introduced dropwise with stirring into an excess of ether, and the white powder precipitated dried in vacuo for 24 hours at 60° C. A clear colourless solution with a solids content of approximately 20% by weight was obtained by dissolving 18.0 parts by weight of this powder in 82 parts by weight of an approximately 3% aqueous $NH_3$ solution. This solution could be used as a size either directly or after suitable dilution.

Size C

This was prepared in the same way as size B, but with 4.4 parts of isoamylalcohol instead of methanol.

Size D

This was prepared in the same way as sizes B and C, but with 3.0 parts of isopropanol instead of methanol and isoamylalcohol.

Size E

A mixture of 98 parts of maleic acid anhydride, 150 parts of diisobutylene and 136 parts of dry toluene was polymerised in a 1 liter 3-necked flask equipped with a stirrer, internal thermometer, dropping funnel, reflux condenser, $N_2$-inlet and outlet, by the dropwise addition of 2.10 parts of benzoyl peroxide in 36 parts of toluene at 80° C. After a polmerisation time of 24 hours, a solution of 30 parts of isopropanol in 25 parts of toluene was added dropwise to this polymer solution, followed by heating under reflux for another 2 hours. 660 parts of electrolyte water and 116 parts of 25% ammonia were then added. The rest of the solvent was then removed from the emulsion formed by applying a weak vacuum and a temperature of from 80° to 90° C. A clear, pale yellow solution having a solids content of 21.8% by weight was finally obtained and this solution can be used as a size either directly or after suitable dilution.

Size F

This was prepared in the same way as size B but with 5.0 parts of cyclohexanol instead of methanol.

Size G

This was prepared in the same way as size B but with 13.5 parts of stearylalcohol instead of methanol.

The use of sizes A to G is described by way of example in the following:

The unsized paper used was produced from bleached sulphite cellulose with addition of approximately 1.5% of aluminium sulphate, based on the dry starting material, and had a weight of approximately 80 g/m².

The presized paper used was prepared from bleached sulphite cellulose with addition of approximately 0.3% of conventional resin size (abietate-based) and approximately 2% of aluminium sulphate (based on dry cellulose), and also had a weight of approximately 80 g/m².

The sizing solution used for surface sizing was a solution of 5% by weight of starch (Perfectamyl A4692, (Trade Mark), a product of Messrs. AVEBE) and 0.2 to 0.4% by weight of the size to be tested (expressed as 100% active substance) in 94.8 to 94.6% by weight of water.

Sizing was carried out in a laboratory sizing press of the HF-type manufactured by Messrs. Werner Mathis, Zurich, Switzerland. The sizing solution had a temperature of approximately 20° C. and a liquid level of approximately 3 cm in the sizing press. The paper was drawn through the press at a rate of 4 meters per minute.

The surface-sized papers were dried for 1 minute at about 100° C. on a drying cylinder. Before size testing, the papers were conditioned for 2 hours at room temperature. Pieces of the papers were then preweighed, immersed in water at 20° C. for 1 minute, pressed once between pieces of filter paper by means of a 10 kg roller weight and then reweighed. The water uptake value on both sides was calculated in $g/m^2$ from the difference in weight. The lower the water uptake, the better the effect of the size tested. A good sizing effect is obtained where the water uptake amounts to approximately 40 $g/m^2$ or less.

The percentages quoted in the Tables relate to the proportion of size present in the sizing solution, expressed as 100% active substance.

EXAMPLES 1–5

Table 1 below shows that good sizing effects can be obtained with the sizes described on unsized papers containing aluminium ions:

Table 1

| Surface sizing of unsized paper Water uptake of the unsized paper: 78 $g/m^2$ | | | |
|---|---|---|---|
| | Water uptake in $g/m^2$ with | | |
| | 0.04% | 0.064% | 0.08% |
| Size | of size (100%) added to the solution | | |
| A | 45.0 | 31.8 | 29.2 |
| B | 36.9 | 31.4 | 31.4 |
| C | 36.0 | 30.3 | 29.5 |
| D | 39.1 | 31.4 | 30.0 |
| E | 40.0 | 32.0 | 31.0 |
| F | 41.2 | 33.4 | 31.3 |
| G | 39.6 | 32.4 | 30.9 |

EXAMPLES 6–10

Table 2 below shoes the water uptake of presized paper surface-sized in the sizing press:

Table 2

| Surface sizing of presized paper Water uptake of the presized paper: 67 $g/m^2$ | | | |
|---|---|---|---|
| | Water uptake in $g/m^2$ with | | |
| | 0.04% | 0.064% | 0.08% |
| Size | of size (100%) added to the solution | | |
| A | 41.0 | 36.6 | 32.4 |
| B | 37.4 | 33.7 | 33.0 |
| C | 36.3 | 33.3 | 32.0 |
| D | 37.8 | 35.2 | 33.9 |
| E | 37.2 | 31.2 | 30.6 |
| F | 38.6 | 32.8 | 30.8 |
| G | 39.7 | 33.2 | 31.5 |

Comparison Example 1

The improved sizing effect of the sizes according to the invention in relation to products produced in accordance with U.S. Patent Specification No. 2,725,367 is shown in Table 3 below with reference to the example of size D.

Table 3

| Surface sizing of unsized paper Water uptake of the unsized paper: 78 $g/m^2$ | | | |
|---|---|---|---|
| | Water uptake in $g/m^2$ with | | |
| | 0.04% | 0.064% | 0.08% |
| Size | of size (100%) added to the solution | | |
| D | 42.1 | 31.9 | 30.3 |
| Comparison Product | 49.4 | 37.0 | 31.7 |

Comparison Example 2

Table 4 below shows that the sizes according to the invention have a considerably better sizing effect on unsized and presized paper than a conventional size (ammonium salt of a 1:1 copolymer of styrene and maleic acid isopropyl semiester):

Table 4

| Addition of 0.08% by weight of size (100%) to the solution | | |
|---|---|---|
| | Water uptake in $g/m^2$ | |
| Size | Unsized Paper | Presized Paper |
| Ammonium salt of a 1:1 copolymer of maleic acid isopropyl semiester and styrene | 59.0 | 39.7 |
| A | 29.2 | 32.4 |
| B | 31.4 | 33.0 |
| C | 29.5 | 32.0 |
| D | 30.0 | 33.9 |
| E | 31.0 | 30.6 |
| F | 31.3 | 30.8 |
| G | 30.9 | 31.5 |

EXAMPLE 11

Table 5 below, with reference to the example of size D, shows that the sizes according to the invention are unaffected by variations in pH both in the case of unsized paper and in the case of presized paper.

Table 5: Influence of pH on the surface sizing of unsized and presized paper. Quantity of size (100%) added to the solution: 0.08%. Water uptake of the unsized paper: 94 $g/m^2$. Water uptake of the presized paper: 59 $g/m^2$

| | Water uptake ($g/m^2$) | |
|---|---|---|
| pH-value | Unsized paper | Presized paper |
| 10 | 36.4 | 33.1 |
| 9 | 33.2 | 35.7 |
| 8.1 | 34.4 | 37.6 |
| 7 | 34.8 | 37.8 |
| 6 | 33.3 | 38.1 |
| 5 | 34.9 | 38.2 |

We claim:

1. An anionic size for paper or a paper-like material comprising an aqueous or aqueous-alcoholic alkali, aliphatic amine or ammonium salt solution of a substantially equimolecular copolymer consisting of maleic acid anhydride and diisobutylene wherein from 10 to 100 mol-% of the anhydride groups are esterified with a linear or branched aliphatic monoalcohol containing 1 to 20 carbon atoms or with a cycloaliphatic monoalcohol containing 5 to 6 carbon atoms to form the corresponding semi-ester.

* * * * *